United States Patent
Hall et al.

(10) Patent No.: US 10,627,490 B2
(45) Date of Patent: Apr. 21, 2020

(54) MULTIPLE PULSE, LIDAR BASED 3-D IMAGING

(71) Applicant: Velodyne LIDAR, Inc., Morgan Hill, CA (US)

(72) Inventors: David S. Hall, Los Altos Hills, CA (US); Pieter J. Kerstens, Gilroy, CA (US)

(73) Assignee: Velodyne Lidar, Inc., San Jose, CA (US)

( * ) Notice: Subject to any disclaimer, the term of this patent is extended or adjusted under 35 U.S.C. 154(b) by 288 days.

(21) Appl. No.: 15/339,790

(22) Filed: Oct. 31, 2016

(65) Prior Publication Data

US 2017/0219695 A1  Aug. 3, 2017

Related U.S. Application Data

(60) Provisional application No. 62/289,277, filed on Jan. 31, 2016.

(51) Int. Cl.
| | | |
|---|---|---|
| *G01S 7/48* | (2006.01) | |
| *G01S 7/481* | (2006.01) | |
| *G01S 17/10* | (2020.01) | |
| *G01S 17/42* | (2006.01) | |
| *G01S 7/484* | (2006.01) | |
| *G01S 17/06* | (2006.01) | |
| *G01S 17/89* | (2020.01) | |

(52) U.S. Cl.
CPC ............ *G01S 7/4815* (2013.01); *G01S 7/484* (2013.01); *G01S 17/06* (2013.01); *G01S 17/10* (2013.01); *G01S 17/42* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 4,944,036 A | * | 7/1990 | Hyatt | B60R 16/0373 367/41 |
| 5,309,212 A | * | 5/1994 | Clark | G01S 17/325 356/141.1 |
| 5,572,219 A | * | 11/1996 | Silverstein | H01Q 3/005 342/165 |
| 5,793,163 A | * | 8/1998 | Okuda | G09G 3/14 315/169.2 |

(Continued)

*Primary Examiner* — Hovhannes Baghdasaryan
(74) *Attorney, Agent, or Firm* — Goodwin Procter LLP

(57) ABSTRACT

Methods and systems for performing multiple pulse LIDAR measurements are presented herein. In one aspect, each LIDAR measurement beam illuminates a location in a three dimensional environment with a sequence of multiple pulses of illumination light. Light reflected from the location is detected by a photosensitive detector of the LIDAR system during a measurement window having a duration that is greater than or equal to the time of flight of light from the LIDAR system out to the programmed range of the LIDAR system, and back. The pulses in a measurement pulse sequence can vary in magnitude and duration. Furthermore, the delay between pulses and the number of pulses in each measurement pulse sequence can also be varied. In some embodiments, the multi-pulse illumination beam is encoded and the return measurement pulse sequence is decoded to distinguish the measurement pulse sequence from exogenous signals.

22 Claims, 12 Drawing Sheets

(56) References Cited

U.S. PATENT DOCUMENTS

| | | | | |
|---|---|---|---|---|
| 5,942,688 A * | 8/1999 | Kimura | ............... | G01N 29/348 |
| | | | | 73/598 |
| 7,969,558 B2 * | 6/2011 | Hall | ............... | G01S 7/4813 |
| | | | | 356/5.01 |
| 8,675,181 B2 | 3/2014 | Hall | | |
| 8,767,190 B2 | 7/2014 | Hall | | |
| 2004/0213463 A1 * | 10/2004 | Morrison | ............... | G01B 11/25 |
| | | | | 382/210 |
| 2007/0241955 A1 * | 10/2007 | Brosche | ............... | G01S 7/292 |
| | | | | 342/128 |
| 2009/0122295 A1 * | 5/2009 | Eaton | ............... | G01C 11/025 |
| | | | | 356/5.01 |
| 2010/0045965 A1 * | 2/2010 | Meneely | ............... | G01S 17/102 |
| | | | | 356/5.01 |
| 2013/0070239 A1 * | 3/2013 | Crawford | ............... | G01S 17/66 |
| | | | | 356/139.04 |
| 2013/0300479 A1 * | 11/2013 | Thibault | ............... | H03K 5/06 |
| | | | | 327/173 |
| 2014/0253369 A1 * | 9/2014 | Kelley | ............... | G01S 19/07 |
| | | | | 342/175 |
| 2015/0101234 A1 * | 4/2015 | Priest | ............... | F41G 1/36 |
| | | | | 42/114 |
| 2017/0214861 A1 * | 7/2017 | Rachlin | ............... | G03B 5/00 |
| 2018/0059219 A1 * | 3/2018 | Irish | ............... | G01J 1/08 |

* cited by examiner

MULTIPLE PULSE, LIDAR BASED 3-D IMAGING

CROSS REFERENCE TO RELATED APPLICATION

The present application for patent claims priority under 35 U.S.C. § 119 from U.S. provisional patent application Ser. No. 62/289,277, entitled "Multiple Pulse, LIDAR Based 3-D Imaging," filed Jan. 31, 2016, the subject matter of which is incorporated herein by reference in its entirety.

TECHNICAL FIELD

The described embodiments relate to LIDAR based 3-D point cloud measuring systems.

BACKGROUND INFORMATION

A LIDAR system employs pulses of light to measure distance to an object based on the time of flight (TOF) of each pulse of light. A pulse of light emitted from a light source of the LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured and a distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e., single plane) point cloud. In some examples, rotating mirrors are rotated at very fast speeds (e.g., thousands of revolutions per minute).

However, in many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view. But, the number of pixels such devices can generate per unit time is inherently limited due to limitations on the pulse repetition rate of a single laser. Any alteration of the beam path to achieve a larger coverage area, whether it is by mirror, prism, or actuation of the device, comes at a cost of decreased point cloud density.

As noted above, 3-D point cloud systems exist in several configurations. However, in many applications it is necessary to collect distance measurements over a broad field of view. For example, in an autonomous vehicle application, the vertical field of view should extend down to the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

In some examples, the timing of successive light emission pulses is set such that the return signal associated with a particular pulse emission is detected before the subsequent pulse emission is triggered. This ensures that a detected return signal is properly associated with the particular pulse emission that generated the detected return signal.

In some other examples, multiple pulses are emitted into the surrounding environment before a return signal from any of the multiple pulses is detected. Traditionally, this approach raises the potential for cross-talk among detected signals. In other words, when multiple pulses are emitted into the surrounding environment before a return signal from any of the multiple pulses is detected, a detected return signal might be incorrectly associated with a different pulse emission than the particular pulse emission that gave rise to detected return signal. This can potentially cause errors in distance measurement.

Traditionally, to avoid cross-talk among the multiple pulses, each of the multiple pulses is projected in a different direction. By projecting each of the multiple pulses in a different direction, each volume of space interrogated by each of the multiple pulses is completely separated from any volume of space interrogated by any of the other multiple pulses. As the separation among simultaneously interrogated spaces is increased, the likelihood of inducing measurement error due to cross-talk is reduced.

Whether sequential pulse techniques, or multiple pulse techniques with spatial separation are employed, performance challenges remain.

The detection of return signals includes significant sources of measurement noise. In some examples, a light pulse due to sun light, a solar flare or cosmic ray is detected and mistakenly associated with a particular pulse emission. This results in a false distance measurement. In some other examples, a pulse emission from another LIDAR system is detected and mistakenly associated with a particular pulse emission. Again, this results in a false distance measurement. These problems are exacerbated as measurement ranges are extended for a LIDAR system without increasing laser pulse intensity.

Existing LIDAR systems employ a single light pulse to interrogate a particular volume of the surrounding environment at any given time. These systems are prone to signal contamination from external noise sources such as sun light, cosmic rays or other LIDAR based imaging systems.

Improvements in noise rejection are desired to extend measurement range and reject detected signals associated with illumination sources not associated with the LIDAR system.

SUMMARY

Methods and systems for performing multiple pulse LIDAR measurements are presented herein. In one aspect, each LIDAR measurement beam illuminates a location in a three dimensional environment with a sequence of multiple pulses of illumination light. Each measurement pulse sequence includes multiple pulses of illumination light and results in an estimate of distance between the 3-D LIDAR system and a particular location. Light reflected from the location is detected by a photosensitive detector of the LIDAR system during a measurement window having a duration that is longer than or equal to the time of flight of light from the LIDAR system out to the programmed range of the LIDAR system, and back.

In a further aspect, the LIDAR system determines the time of flight of the multi-pulse measurement beam from the LIDAR device to the particular illuminated spot of the three dimensional environment and back to the LIDAR device.

In some embodiments, a delay time between each LIDAR measurement is set to be greater than the time of flight of the measurement pulse sequence to and from an object located at the maximum range of the LIDAR device. In this manner, there is no cross-talk among different channels of the LIDAR system.

In some other embodiments, a measurement pulse sequence may be emitted from one multi-pulse illumination system before a measurement pulse sequence emitted from another multi-pulse illumination system has had time to return to the LIDAR device. In some embodiments, care is taken to ensure that there is sufficient spatial separation between the areas of the surrounding environment interroated by each beam to avoid cross-talk. In some embodiments, the multi-pulse illumination associated with a particular measurement channel is encoded differently from any other multi-pulse illumination generated by any other measurement channel.

A multi-pulse illumination beam can be encoded according to a code diversity scheme, an amplitude diversity scheme, a time diversity scheme, or any combination thereof. By encoding the measurement pulse sequence and decoding the return measurement pulse sequence, reflected signals associated with illumination by a measurement pulse sequence are distinguished from exogenous signals.

In some examples, the coding of the multi-pulse illumination beam can be pseudorandom. In some examples, the coding of the multi-pulse beam can be changed in response to a measure of channel noise in the return signals. For example, if the return signal includes noise that exceeds a threshold value, another code is selected. In this manner, coding can be selected that minimizes the impact of exogenous noise sources, such as other LIDAR systems.

In general, the sequence of pulses in a measurement pulse sequence can vary in magnitude and duration. Furthermore, the delay between pulses and the number of pulses in each measurement pulse sequence can also be varied.

The foregoing is a summary and thus contains, by necessity, simplifications, generalizations and omissions of detail; consequently, those skilled in the art will appreciate that the summary is illustrative only and is not limiting in any way.

Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
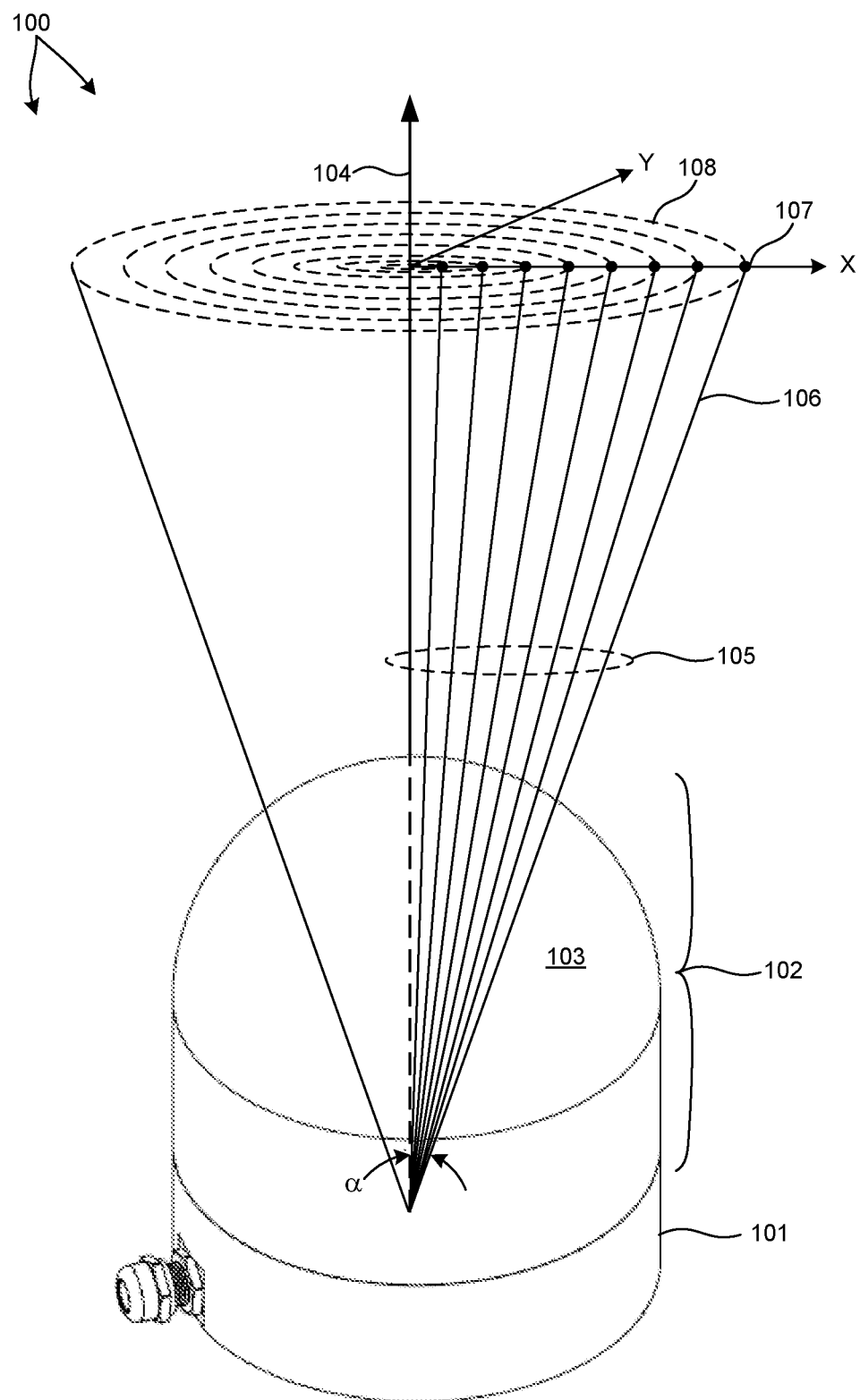
FIG. 1 is a simplified diagram illustrative of one embodiment of a 3-D LIDAR system 100 that may be employed to perform the multiple pulse measurement methods described herein.

FIG. 1 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having wavelengths centered at 905 nanometers.

As depicted in FIG. 1, a plurality of pulsed beams of light 105 are emitted from 3-D LIDAR system 100 through domed shell element 103 over an angular range, α, measured from a central axis 104. In the embodiment depicted in FIG. 1, the chief ray of each beam of light is illustrated. Each chief ray of each beam of light is projected onto a plane defined by the x and y axes at a plurality of different locations spaced apart from one another. For example, beam 106 is projected onto the xy plane at location 107.

In the embodiment depicted in FIG. 1, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, the projection of the chief ray of beam 106 onto the xy plane traces out a circular trajectory 108 centered about central axis 104. The xy plane is depicted in FIG. 1 to illustrate the spatial separation of beams emitted from 3-D LIDAR system 100. In general, the beams emitted from 3-D LIDAR system 100 are projected into the surrounding environment and are incident on objects in the path of each respective beam.

Figure 2:
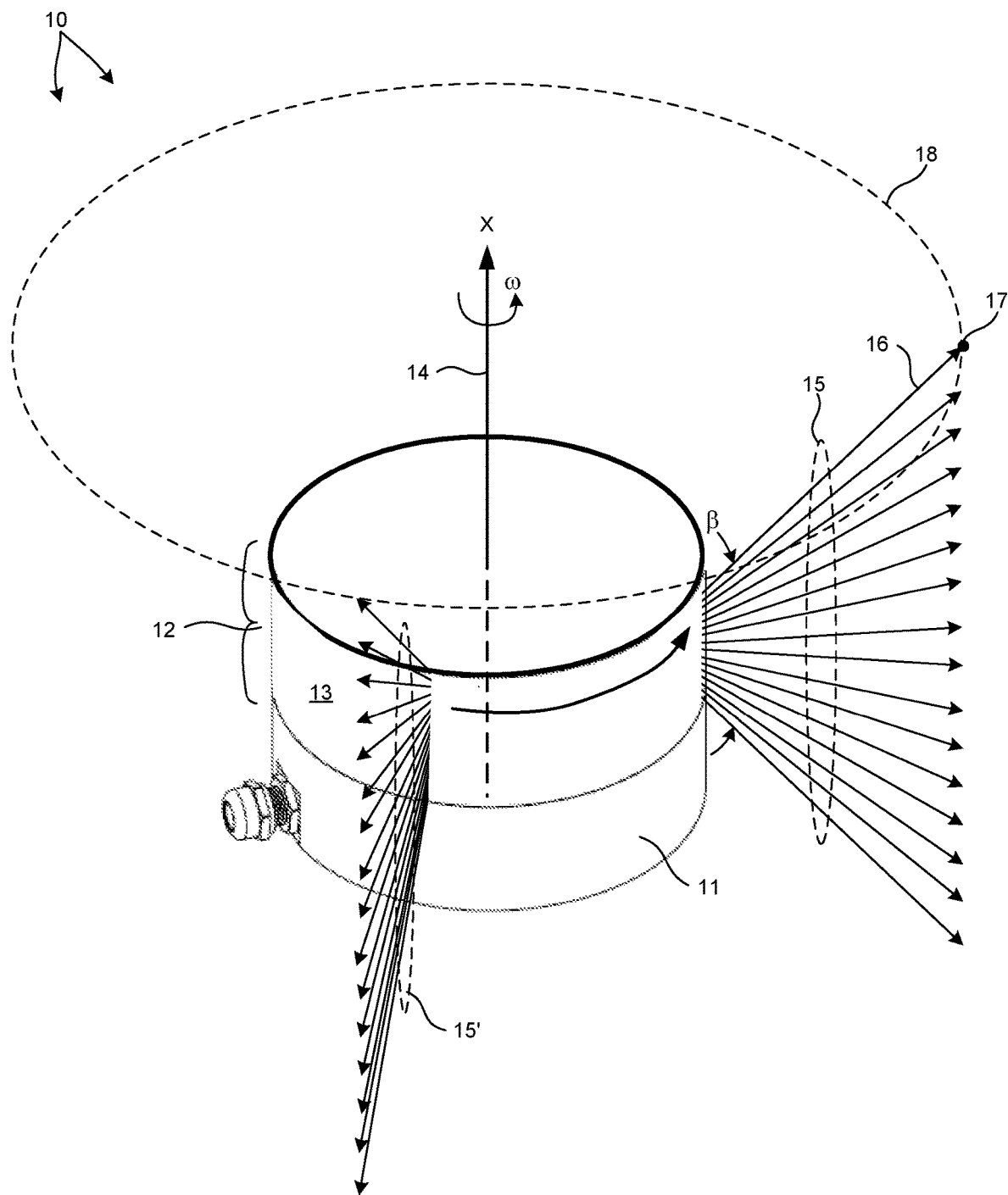
FIG. 2 is a simplified diagram illustrative of another embodiment of a 3-D LIDAR system 10 that may be employed to perform the multiple pulse measurement methods described herein.

FIG. 2 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 2, a plurality of beams of light 15 are emitted from 3-D LIDAR system 10 through cylindrical shell element 13 over an angular range, β. In the embodiment depicted in FIG. 2, the chief ray of each beam of light is illustrated. Each beam of light is projected outward into the surrounding environment in a different direction. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 2, 3-D LIDAR system 10 is configured to scan each of the plurality of beams of light 15 about central axis 14 at angular velocity, ω. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding to the cone shaped illumination beam as it is swept around central axis 14.

Figure 3:
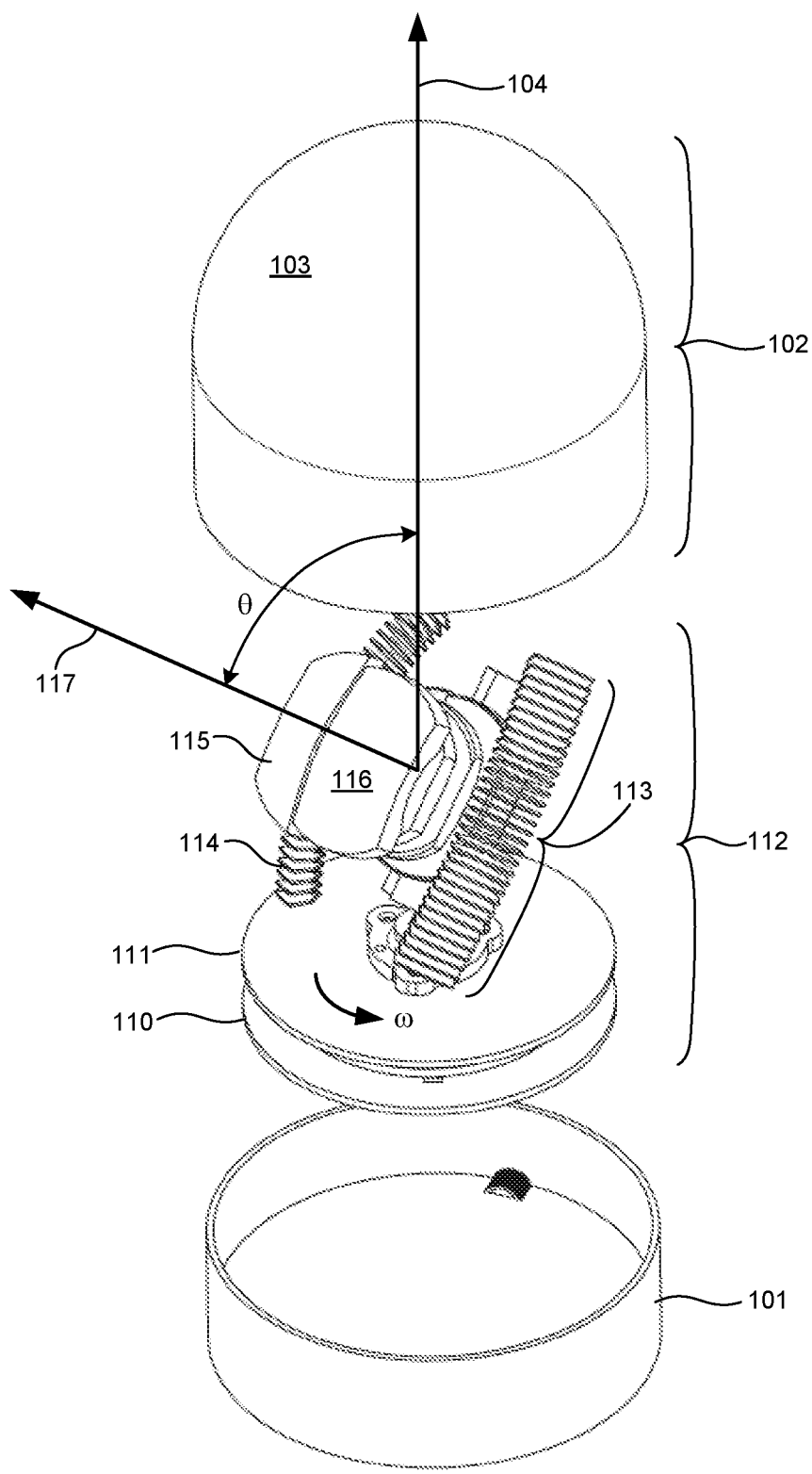
FIG. 3 depicts an exploded view of 3-D LIDAR system 100 in one exemplary embodiment.

FIG. 3 depicts an exploded view of 3-D LIDAR system 100 in one exemplary embodiment. 3-D LIDAR system 100 further includes a light emission/collection engine 112 that rotates about central axis 104. As depicted in FIG. 3, a central optical axis 117 of light emission/collection engine 112 is tilted at an angle, θ, with respect to central axis 104. 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer elements, capacitive elements, or optical elements, resulting in a contactless transmission of these signals. Light emission/collection engine 112 is fixedly positioned with respect to the rotating electronics board 111, and thus rotates about central axis 104 at the predetermined angular velocity, ω.

As depicted in FIG. 3, light emission/collection engine 112 includes an array of light emitting elements 114 and an array of light detecting elements 113. Light emitted from each of the light emitting elements 114 is directed toward a mirror (not shown). Light reflected from the mirror passes through a series of illumination optics 115 that collimate the emitted light into the array of beams of light 105 that are emitted from 3-D LIDAR system 100 as depicted in FIG. 1. In general, any number of light emitting elements can be arranged to simultaneously, or substantially simultaneously, emit any number of light beams from 3-D LIDAR system 100. In addition, any number of light emitting elements can be arranged to sequentially emit any number of light beams from 3-D LIDAR system 100. In one embodiment, two or more light emitting elements are triggered to emit light substantially simultaneously, and then after a programmed period of time has elapsed, another two or more light emitting elements are triggered to emit light substantially simultaneously. Light reflected from objects in the environment is collected by collection optics 116. Collected light associated with each illumination beam passes through collection optics 116 where it is focused onto each respective detecting element of the array of detecting elements 113. After passing through collection optics 116, the collected light is reflected from a mirror (not shown) onto each detector element. In practice, crosstalk among each measurement channel limits the number of channels that can be triggered simultaneously. However, to maximize imaging resolution, it is desirable to trigger as many channels as possible, simultaneously, so that time of flight measurements are obtained from many channels at the same time, rather than sequentially.

Figure 4:
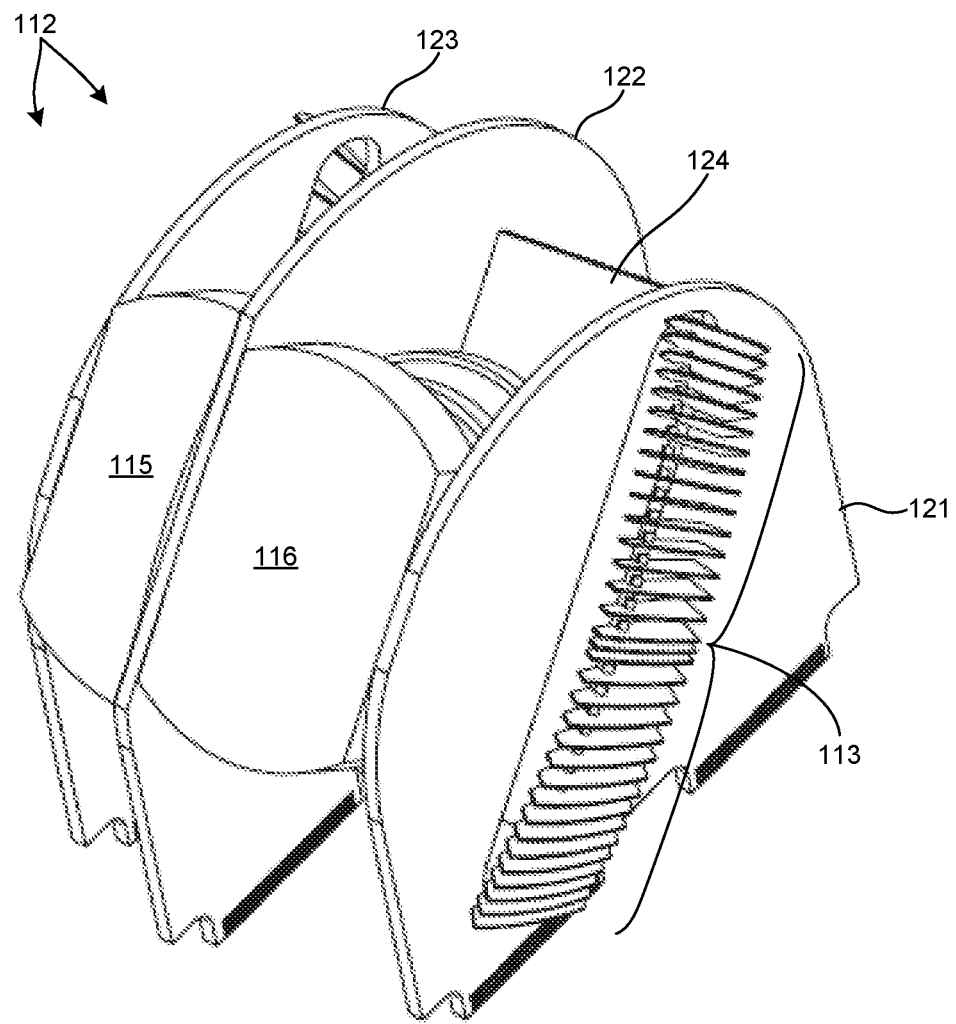
FIG. 4 depicts a view of light emission/collection engine 112 of 3-D LIDAR system 100.

FIG. 4 depicts another view of light emission/collection engine 112. In one aspect, light emission/collection engine 112 includes intermediate electronics boards 121, 122, and 123 which provide mechanical support and electrical connectivity between rotating electronics board 111 and various elements of light emission/collection engine 112. For example, each of the array of light detecting elements 113 is mounted to intermediate electronics board 121. Intermediate electronics board 121, in turn, is mechanically and electrically coupled to rotating electronics board 111. Similarly, each of the array of light emitting elements 114 is mounted to intermediate electronics board 123. Intermediate electronics board 123, in turn, is mechanically and electrically coupled to rotating electronics board 111. In another example, illumination optics 115 and collection optics 116 are mechanically mounted to intermediate electronics board 122. In this example, intermediate electronics board 122 spatially and optically separates the illumination optics 115 and the collection optics 116 to avoid contamination of the collected light with illumination light. Intermediate electronics board 122, in turn, is mechanically and electrically coupled to rotating electronics board 111. In this manner, the intermediate electronics boards provide mechanical and electrical connectivity and additional board area for mounting electrical components required for the operation of 3-D LIDAR system 100.

Figure 5:
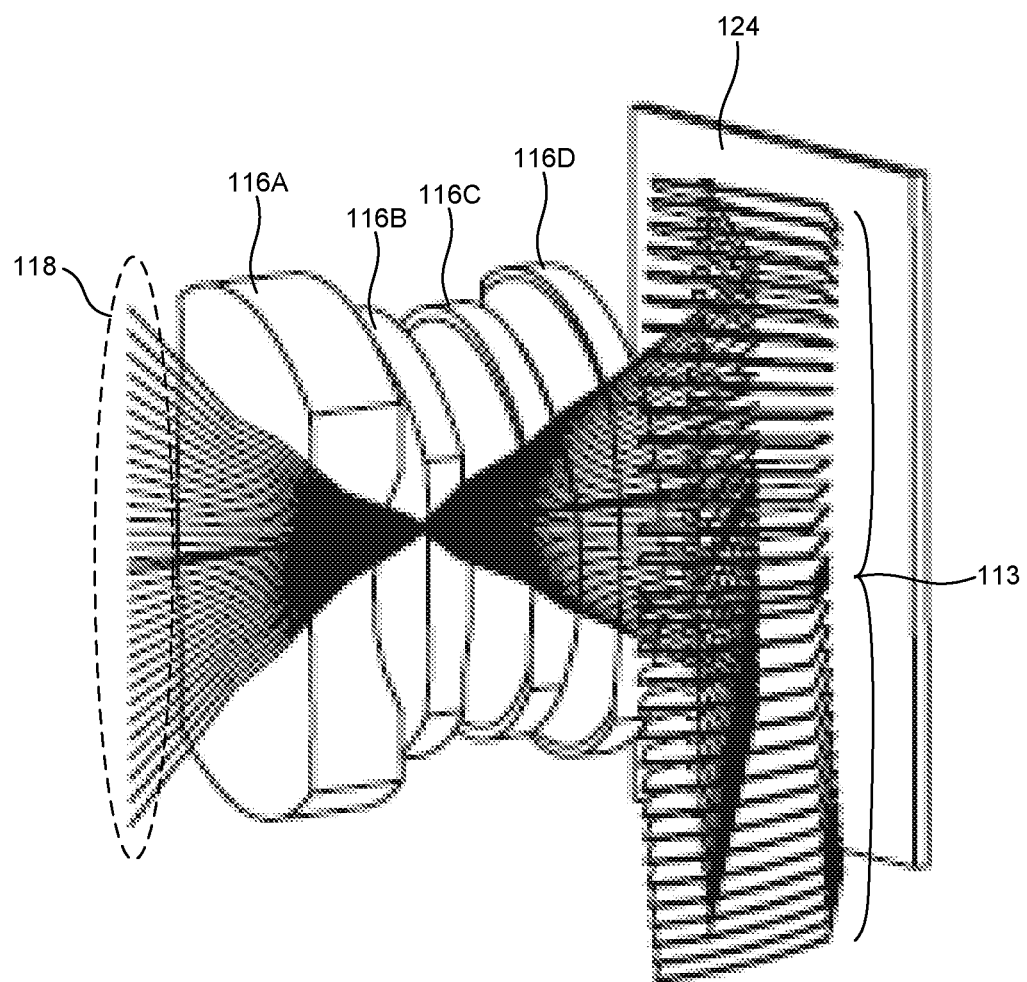
FIG. 5 depicts a view of collection optics 116 of 3-D LIDAR system 100 in greater detail.

FIG. 5 depicts a view of collection optics 116 in greater detail. As depicted in FIG. 5, collection optics 116 include four lens elements 116A-D arranged to focus collected light 118 onto each of the array of detecting elements 113. Light passing through collection optics 116 is reflected from mirror 124 and is directed onto each of the array of detecting elements 113. In another aspect, one or more of the optical elements of collection optics 116 is constructed from one or more materials that absorb light outside of a predetermined wavelength range that includes the wavelengths of light emitted by each of the array of light emitting elements 114. In one example, one or more of the lens elements are constructed from a plastic material that includes a colorant additive to absorb light having wavelengths less than infrared light generated by each of the array of light emitting elements 114. In one example, the colorant is Epolight 7276A available from Aako BV (The Netherlands). In general, any number of different colorants can be added to any of the plastic lens elements of collection optics 116 to filter out undesired spectra.

Figure 6:
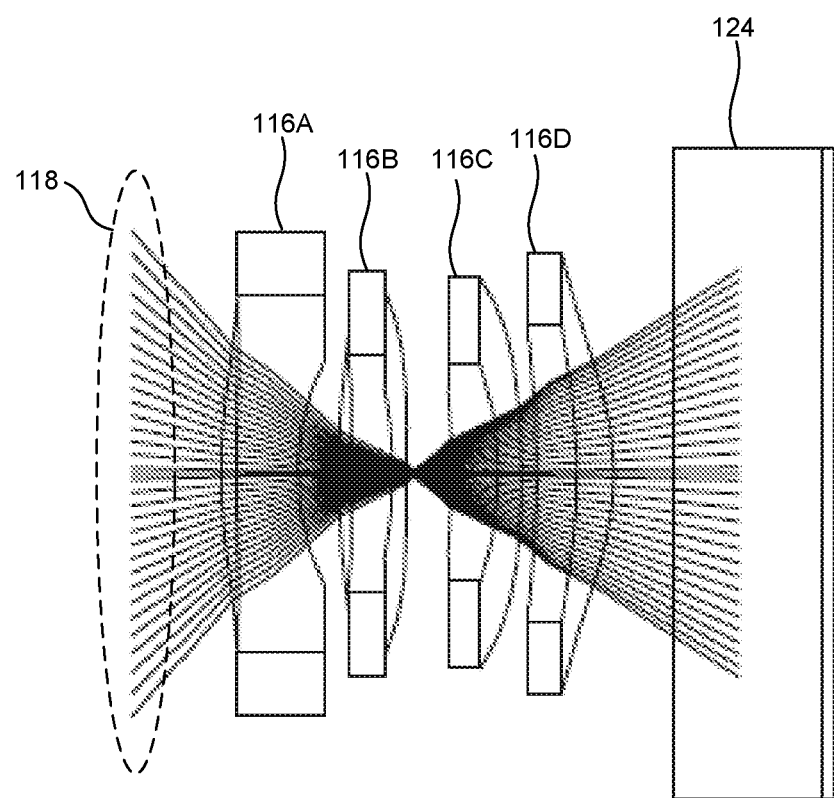
FIG. 6 depicts a cutaway view of collection optics 116 of 3-D LIDAR system 100 that illustrates the shaping of each beam of collected light 118.

FIG. 6 depicts a cutaway view of collection optics 116 to illustrate the bending of each beam of collected light 118.

As described hereinbefore, one or more of the optical elements of collection optics 116 is constructed from one or more materials that absorb light outside of a predetermined wavelength range that includes the wavelengths of light emitted by each of the array of light emitting elements 114. However, in general, one or more of the optical elements of illumination optics 115 may also be constructed from one or more materials that absorb light outside of a predetermined wavelength range that includes the wavelengths of light emitted by each of the array of light emitting elements 114.

A LIDAR system, such as 3-D LIDAR system 10 depicted in FIG. 2, and system 100, depicted in FIG. 1, includes a pulsed illumination source emitting a pulsed beam of illumination light from the LIDAR device into the surrounding environment. In some embodiments, the pulsed illumination source is laser based. In some embodiments, the pulsed illumination source is based on one or more light emitting diodes. In general, any suitable pulsed illumination source may be contemplated.

In one aspect, each measurement beam illuminates a particular location of the three dimensional environment (e.g., pixel) with a sequence of multiple pulses of illumination light. Hence, each measurement pulse sequence includes multiple pulses of illumination light that interrogates one location in the surrounding environment and results in an estimate of distance between the 3-D LIDAR system and the location. Light reflected from the location is detected by a photosensitive detector of the LIDAR system during a measurement window having a duration that is less than or equal to the time of flight of light from the LIDAR system out to the programmed range of the LIDAR system, and back. The photosensitive detector detects the measurement pulse sequence reflected from a particular location in the surrounding three dimensional environment. In this manner, the reflection from a particular measurement location of each pulse of the measurement pulse sequence is captured by the LIDAR system.

In a further aspect, the LIDAR system determines the time of flight of the multi-pulse measurement beam from the LIDAR device to the particular illuminated spot of the three dimensional environment and back to the LIDAR device. The time of flight is determined based on the reflected light detected during the measurement window. The distance between the LIDAR device and the particular location of the three dimensional environment illuminated by the multi-pulse beam of illumination light is determined based on the time of flight and the known speed of light.

Figure 7:
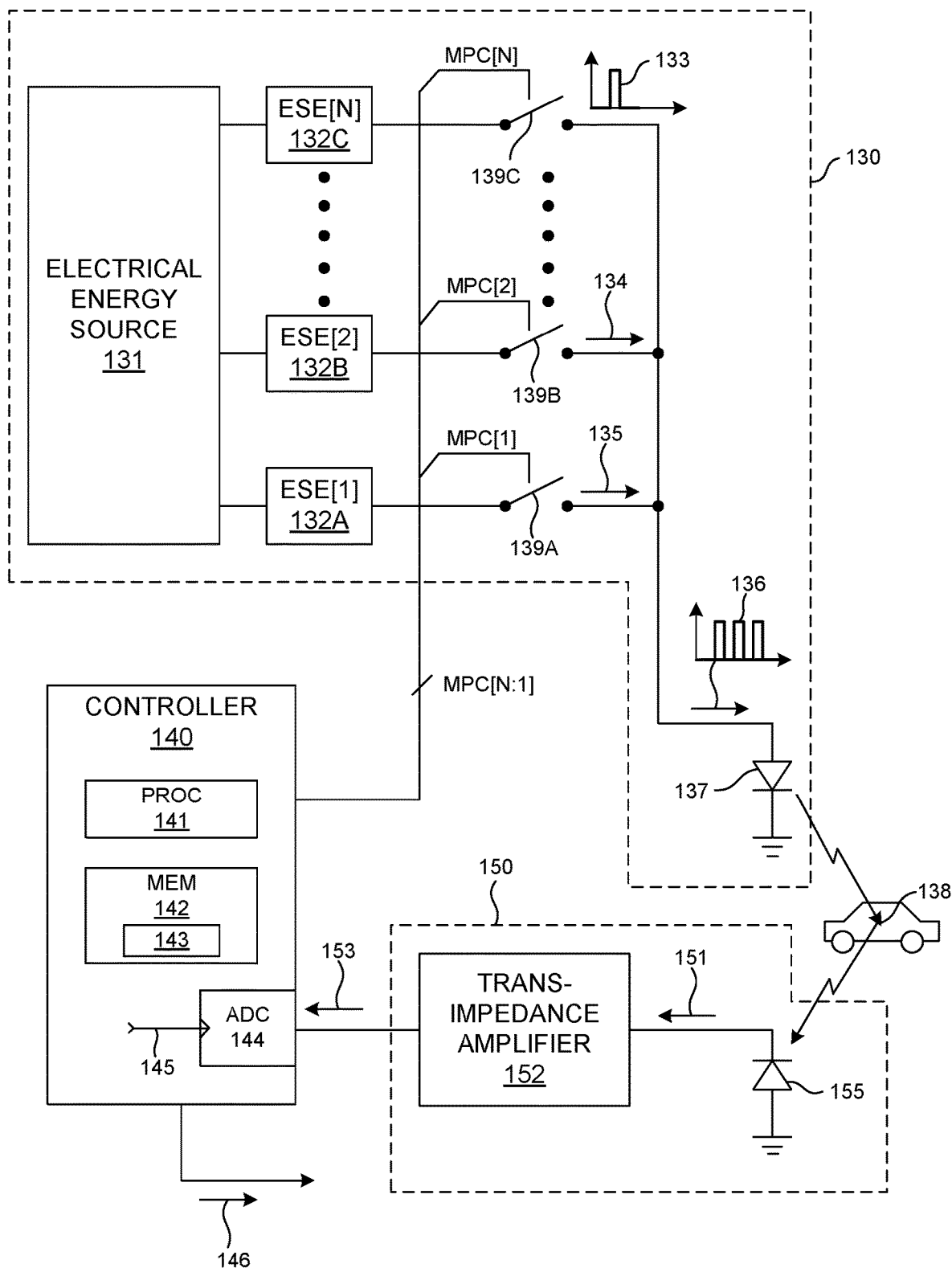
FIG. 7 depicts elements of a 3-D LIDAR system including a multi-pulse illumination system 130, a light detection system 150, and controller 140.

FIG. 7 depicts elements of a LIDAR system including a multi-pulse illumination system 130, a multiple pulse light detection system 150, and controller 140 in one embodiment. The embodiment depicted in FIG. 7 is provided by way of non-limiting example, and many other suitable embodiments for performing multiple pulse LIDAR measurements as described herein may be contemplated within the scope of this patent document.

Multi-pulse illumination system 130 includes a pulsed light emitting device 137. Pulsed light emitting device 137 generates pulsed light emission in response to a pulsed electrical signal 136 provided to the pulsed light emitting device. The light generated by pulsed light emitting device 137 is focused and projected onto a particular location 138 in the surrounding environment by one or more optical elements of the LIDAR system as a measurement pulse sequence. In one example, light emitted by pulsed light emitting device 137 is focused and projected onto a particular location by illumination optics 115 that collimate the emitted light into a multi-pulse beam of light 16 emitted from 3-D LIDAR system 10 as depicted in FIG. 2.

Multi-pulse illumination system 130 includes any number of electrical energy storage elements (ESE) selectively coupled to the pulsed light emitting device 137. For illustration purposes, FIG. 7 depicts three energy storage elements (labeled ESE 132A-C) of N energy storage elements, where N can be any integer number. In some examples, each energy storage element is a capacitor. An electrical energy source 131 (e.g., a voltage source) is electrically coupled to each of the energy storage elements and provides electrical energy to each of electrical energy storage elements. Each of the electrical energy storage elements is selectively coupled to the pulsed light emitting device 137 by a switching element. Again, for illustration purposes, FIG. 7 depicts three switching elements (labeled 139A-C) of N switching elements. Each switching element is configured to toggle between two states depending on the state of a control signal (e.g., digital control signal, MPC). In a first state, a switching element is substantially non-conductive. In this state, a corresponding energy storage element is effectively disconnected from the pulsed light emitting device 137. In this state, electrical energy flows from the electrical energy source 131 to each corresponding energy storage element to effectively charge the energy storage element. In a second state, the switching element is substantially conductive. In this state, the corresponding energy storage element is electrically coupled to the pulsed light emitting device 137. In this state, electrical energy flows from the energy storage element to the pulsed light emitting device 137.

As depicted in FIG. 7, any electrical current simultaneously supplied to the pulsed light emitting device 137 by any of the energy storage elements is effectively additive. In this manner, the electrical current signal 136 provided to the pulsed light emitting device 137 is effectively shaped by control signal, MPC. For example, when MPC[N] controls switching element 139C to toggle from a substantially non-conductive state to a substantially conductive state, a pulse of electrical current 133 is provided to pulsed light emitting device 137. Similarly, pulses of electrical current 134 and 135 can be provided to pulsed light emitting device 137 from energy storage elements ESE 132B and ESE 132A, respectively.

As depicted in FIG. 7, controller 140 generates control signal, MPC, which controls the timing of electrical current pulses provided to pulsed light emitting device 137, and thus, the timing of pulses of light emitted from the LIDAR device.

In general, each of the sequence of pulses commanded by controller 140 can vary in magnitude and duration. Furthermore, the delay between pulses and the number of pulses in each measurement pulse sequence can also be varied. In some examples, one pulse of the measurement pulse sequence has a larger amplitude than another pulse of the same measurement pulse sequence. In some examples, one pulse of the measurement pulse sequence has a longer duration than another pulse of the same measurement pulse sequence. In some examples, one pulse of the measurement pulse sequence has both a longer duration and greater amplitude than another pulse of the same measurement pulse sequence.

Figure 12:
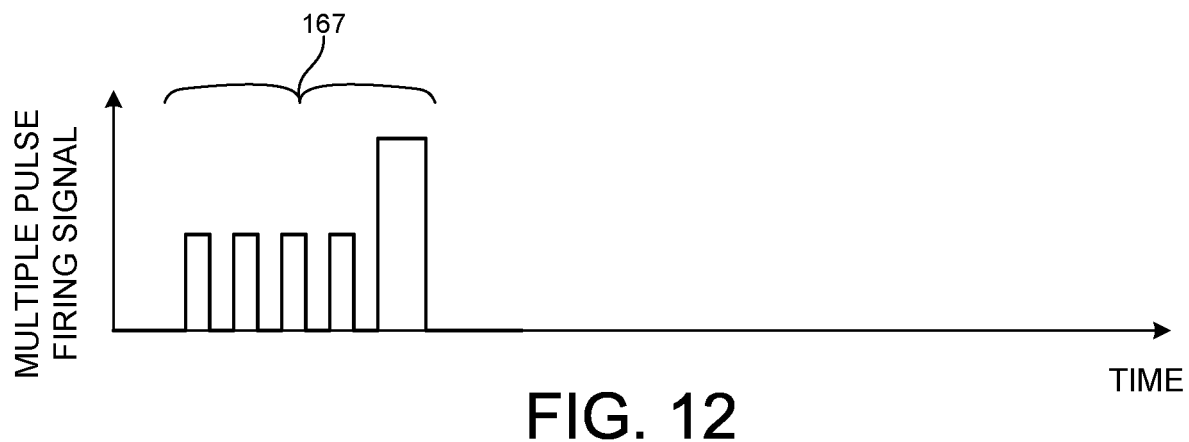
FIG. 12 depicts an illustration of a measurement pulse sequence 167 including four relatively small amplitude and short duration pulses followed by a fifth pulse having a relatively large amplitude and long duration.

In one embodiment, multi-pulse illumination system 130 includes eight electrical energy storage elements selectively coupled to a pulsed light emitting device in the manner described with reference to FIG. 7. In general, the eight available pulses of optical energy are combined and timed as desired. In one example depicted in FIG. 12, a measurement pulse sequence includes four relatively small amplitude and short duration pulses followed by a fifth pulse having a relatively large amplitude and long duration. Each of the first four pulses is generated by triggering the discharge of one energy storage element. The fifth pulse is generated by triggering the remaining four energy storage elements simultaneously into the pulsed light emitting device. In another embodiment, the fifth pulse may be generated by a single energy storage element that has a larger energy storage capacity. In this manner, the measurement light sequence includes four relatively small amplitude pulses followed by one large amplitude pulse. This may be desirable as the first four pulses are suitable for short distance measurements, and the large amplitude pulse is suitable for relatively long distance measurements. In general, the energy storage elements may be sized in any suitable manner and any number of energy storage elements may be triggered simultaneously to obtain a desired pulse amplitude within a multiple pulse illumination sequence.

In general, a multi-pulse illumination system 130 may include any number of electrical energy storage elements selectively coupled in series with a pulsed light emitting device. Furthermore, one or more of the electrical energy storage elements may have an energy storage capacity that differs from one or more of the other electrical energy storage elements.

Figure 13:
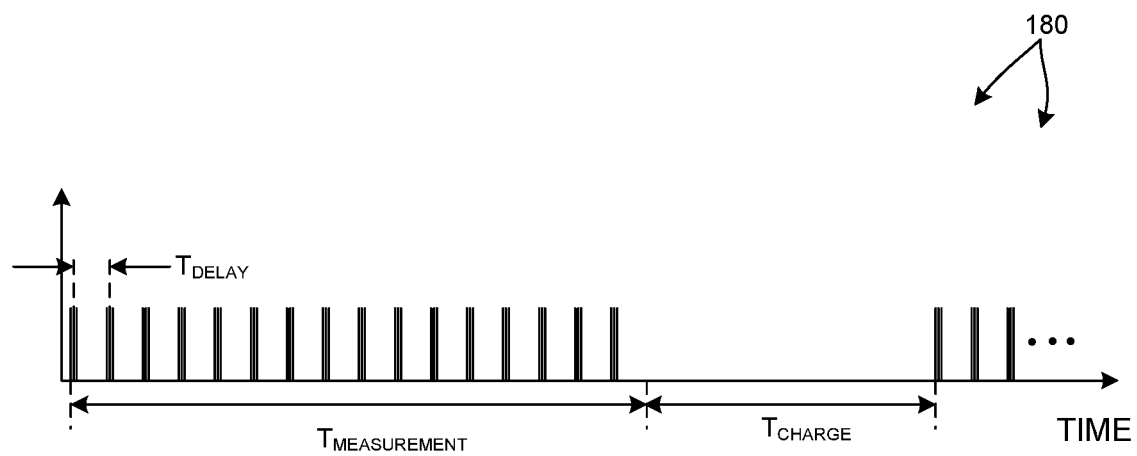
FIG. 13 depicts an illustration of the timing of light emission from sixteen multi-pulse illumination sub-systems.

In a further embodiment, a LIDAR system, such as LIDAR system 10 depicted in FIG. 2, includes sixteen multi-pulse illumination systems operating in coordination with a common controller (e.g., controller 140). FIG. 13 depicts an exemplary diagram 180 illustrating the timing of light emission from each of the sixteen multi-pulse illumination systems.

As depicted in FIG. 13, a measurement pulse sequence is emitted from a first multi-pulse illumination system. After a delay time, $T_{DELAY}$, a measurement pulse sequence is emitted from a second multi-pulse illumination system of the LIDAR device. In this manner a sequence of sixteen measurement pulse sequences are emitted in different directions from the LIDAR device during a measurement period, $T_{MEASUREMENT}$. The energy storage elements of each of the sixteen multi-pulse illumination systems are charged after the measurement period for a charging period, $T_{CHARGE}$. After, the charging period, another measurement pulse sequence is emitted from each multi-pulse illumination system over a subsequent measurement period.

In some embodiments, the delay time, $T_{DELAY}$, is set to be greater than the time of flight of the measurement pulse sequence to and from an object located at the maximum range of the LIDAR device. In this manner, there is no cross-talk among any of the sixteen multi-pulse illumination systems.

In some other embodiments, a measurement pulse sequence may be emitted from one multi-pulse illumination system before a measurement pulse sequence emitted from another multi-pulse illumination system has had time to return to the LIDAR device. In some of these embodiments, care is taken to ensure that there is sufficient spatial separation between the areas of the surrounding environment interroated by each beam to avoid cross-talk. In some of these embodiments, the multi-pulse illumination generated by any multi-pulse illumination system employed by the LIDAR system is encoded differently from any other multi-pulse illumination generated by any other multi-pulse illumination system. In this manner, the return signal associated each multi-pulse illumination beam can be differentiated from any other collected light, even if there is spatial overlap among the beams.

As depicted in FIG. 7, light reflected from location 138 is detected by light detector 155. Light detector 155 generates an output signal 151 that is amplified by an analog trans-impedance amplifier 152. In general, the amplification of output signal 151 may include multiple, amplifier stages. In this sense, analog trans-impedance amplifier 152 is provided by way of non-limiting example, as many other analog signal amplification schemes may be contemplated within the scope of this patent document.

The amplified signal 153 is communicated to controller 140. An analog-to-digital converter (ADC) 144 of controller 140 is employed to convert the analog signal 153 into a digital signal used for further processing. Controller 140 generates an enable/disable signal 145 employed to control the timing of data acquisition by ADC 144 in concert with multi-pulse control signal, MPC.

Figure 8:
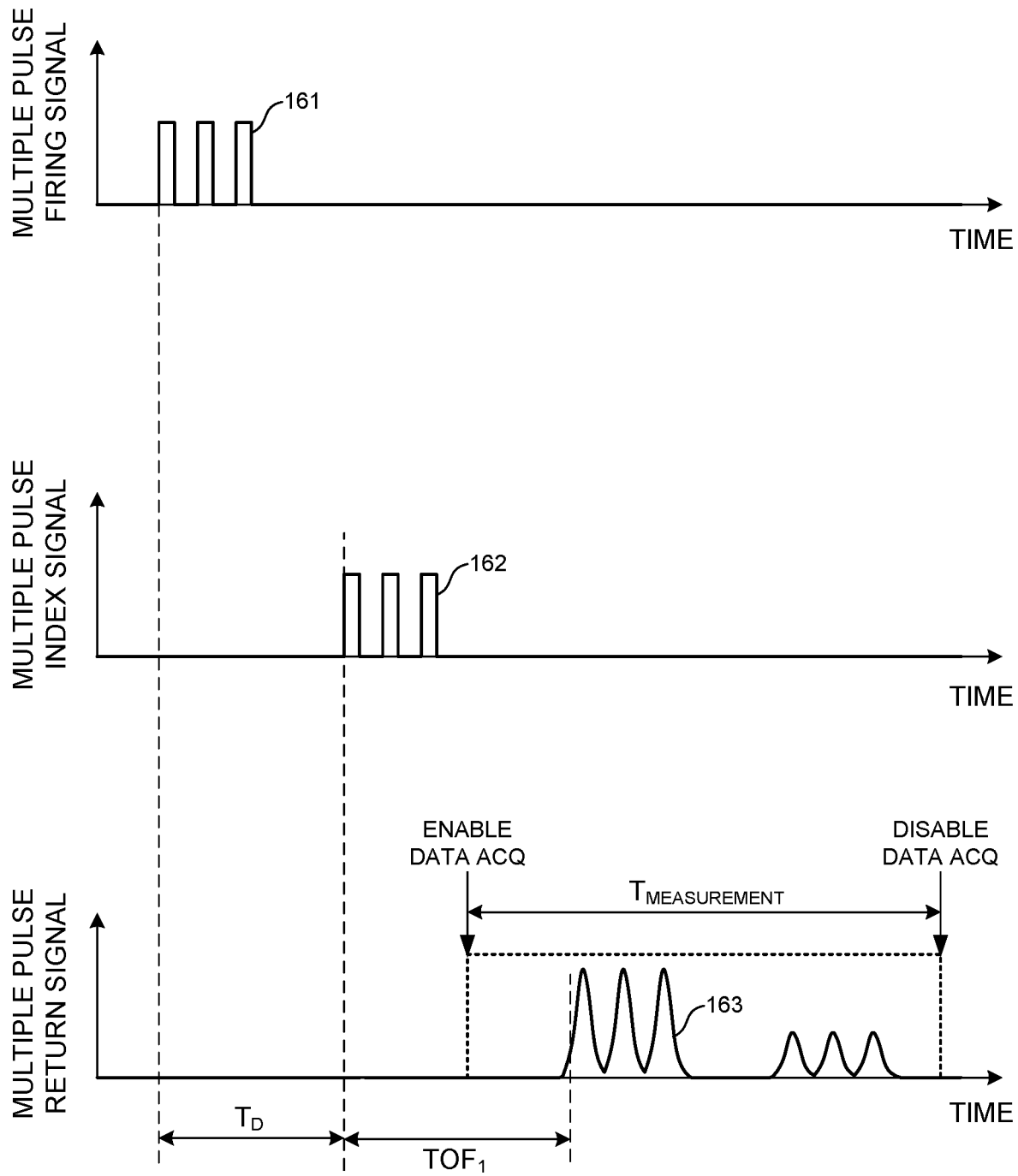
FIG. 8 depicts an illustration of the timing of emission of a multiple pulse measurement beam and capture of the returning measurement pulse sequence.

FIG. 8 depicts an illustration of the timing associated with the emission of a measurement pulse sequence and capture of the returning measurement pulse sequence. As depicted in FIG. 8, the measurement begins with a multiple pulse firing signal 161 (e.g., MPC[1]) generated by controller 140. Due to internal system delay, an index signal 162 is determined that is shifted from the multiple pulse firing signal 161 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.). The index signal 162 may be a multiple pulse signal as depicted in FIG. 8, or a single pulse signal. The index signal is generated as a way to measure time delay within the system. As such, the index signal may be regenerated at any suitable time during system operation. In addition, an index signal may be employed to estimate time delay associated with one or more measurement channels.

As depicted in FIG. 8, a return signal 163 is detected by the LIDAR system in response to the illumination of a particular location. A measurement window (i.e., a period of time over which collected return signal data is associated with a particular measurement pulse sequence) is initiated by enabling data acquisition from light detecting element 150. Controller 140 controls the timing of the measurement window to correspond with the window of time when a return signal is expected in response to the emission of a measurement pulse sequence. In some examples, the measurement window is enabled at the point in time when the measurement pulse sequence is emitted and is disabled at a time corresponding to the time of flight of light over a distance that is twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 8, return signal 163 includes two return measurement pulse sequences that correspond with the emitted measurement pulse sequence. In general, signal detection is performed on all detected measurement pulse sequences. Further signal analysis may be performed to identify the closest signal (e.g., first instance of the return measurement pulse sequence), the strongest signal, and the furthest signal (e.g., last instance of the return measurement pulse sequence in the measurement window). Any of these instances may be reported as potentially valid distance measurements by the LIDAR system. For example, a time of flight, $TOF_1$, may be calculated from the closest (i.e., earliest) return measurement pulse sequence that corresponds with the emitted measurement pulse sequence as depicted in FIG. 8.

The emission and collection of measurement pulse sequences in the measurement of distance between a LIDAR system and a particular location in the surrounding environment enables the implementation of a number of schemes for noise rejection. This can result in an increase in achievable range and a reduction in sensitivity to unwanted signals (e.g., sun noise, solar flares, cross-talk from other LIDAR devices, etc.). The multi-pulse illumination beam can be encoded according to a code diversity scheme, an amplitude diversity scheme, a time diversity scheme, or any combination thereof. By encoding the measurement pulse sequence and decoding the return measurement pulse sequence, reflected signals associated with illumination by the measurement pulse sequence are distinguished from exogenous signals.

In some examples, the coding of the multi-pulse illumination beam can be pseudorandom. In some examples, the coding of the multi-pulse beam can be changed in response to a measure of channel noise in the return signals. For example, if the return signal includes noise that exceeds a threshold value, another code is selected. In this manner, coding can be selected that minimizes the impact of exogenous noise sources, such as other LIDAR systems.

Figure 9:
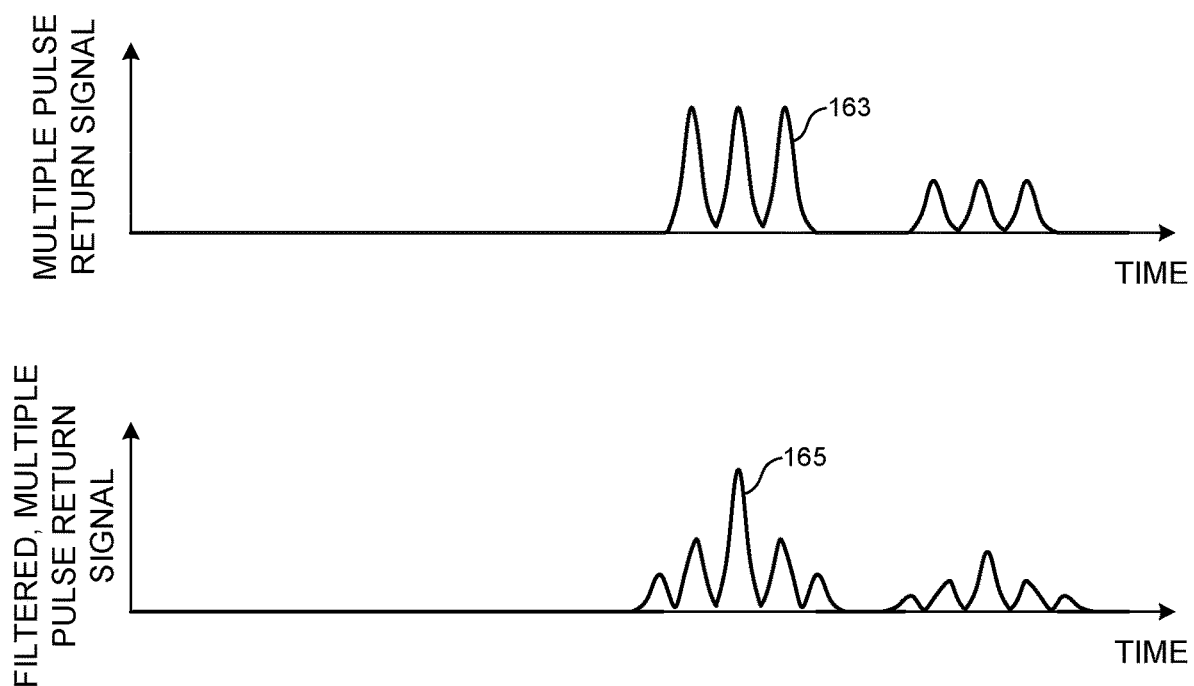
FIG. 9 depicts an illustration of a return measurement pulse sequence before an after filtering.

In one example depicted in FIG. 9, the return measurement pulse sequence 163 is filtered, for example, by a signature detection filter. In one example, the signature detection filter is an autocorrelation filter. The filtered signal 165 is also depicted in FIG. 9. In these examples, the collected signal is determined to be a legitimate return measurement pulse sequence if the filtered output signal exceeds a threshold value.

Figure 10:
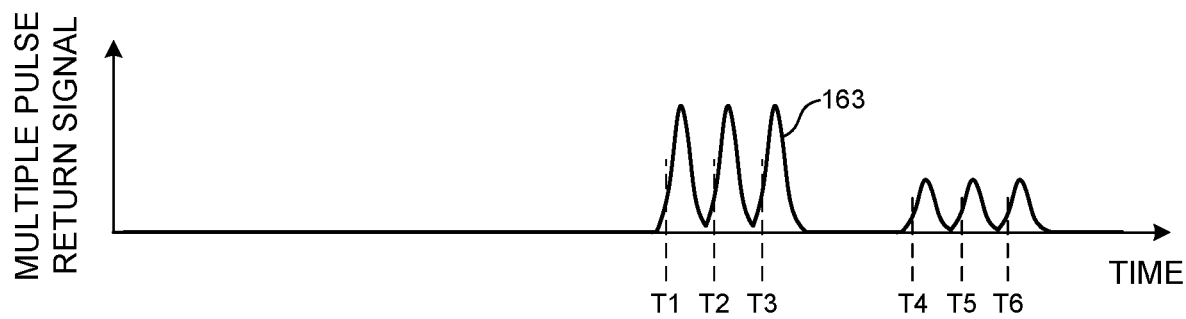
FIG. 10 depicts an illustration of a return measurement pulse sequence including time demarcations.
Figure 11:
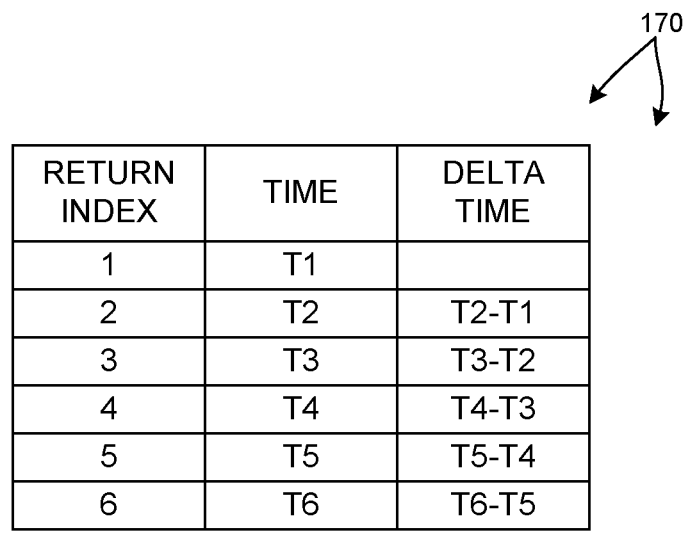
FIG. 11 depicts a table 170 indicating a time associated with each peak of the return measurement pulse sequence depicted in FIG. 10 and a time between adjacent peaks.

In another example depicted in FIGS. 10-11, the temporal spacing of peaks of the return measurement pulse sequence 163 are determined. For example, as depicted in FIG. 11, a table 170 indicates a time associated with each peak of the measurement pulse sequence 163 and a time between adjacent peaks. If a time between each of the successive instances is substantially similar to a time between the emitted measurement pulse sequence, the return measurement pulse sequence is determined to be legitimate. Thus, the time of flight of the multi-pulse beam of illumination light is based on a difference between a time when the multi-pulse beam is emitted from the LIDAR device and the time of detection associated with the plurality of successive instances of the output signal that exceed the threshold value.

In a further aspect, the emission and collection of multiple pulse sequences in the measurement of distance between a LIDAR system and a particular location in the surrounding environment enables the estimation of relative velocity between the LIDAR system and a detected object.

Figure 14:
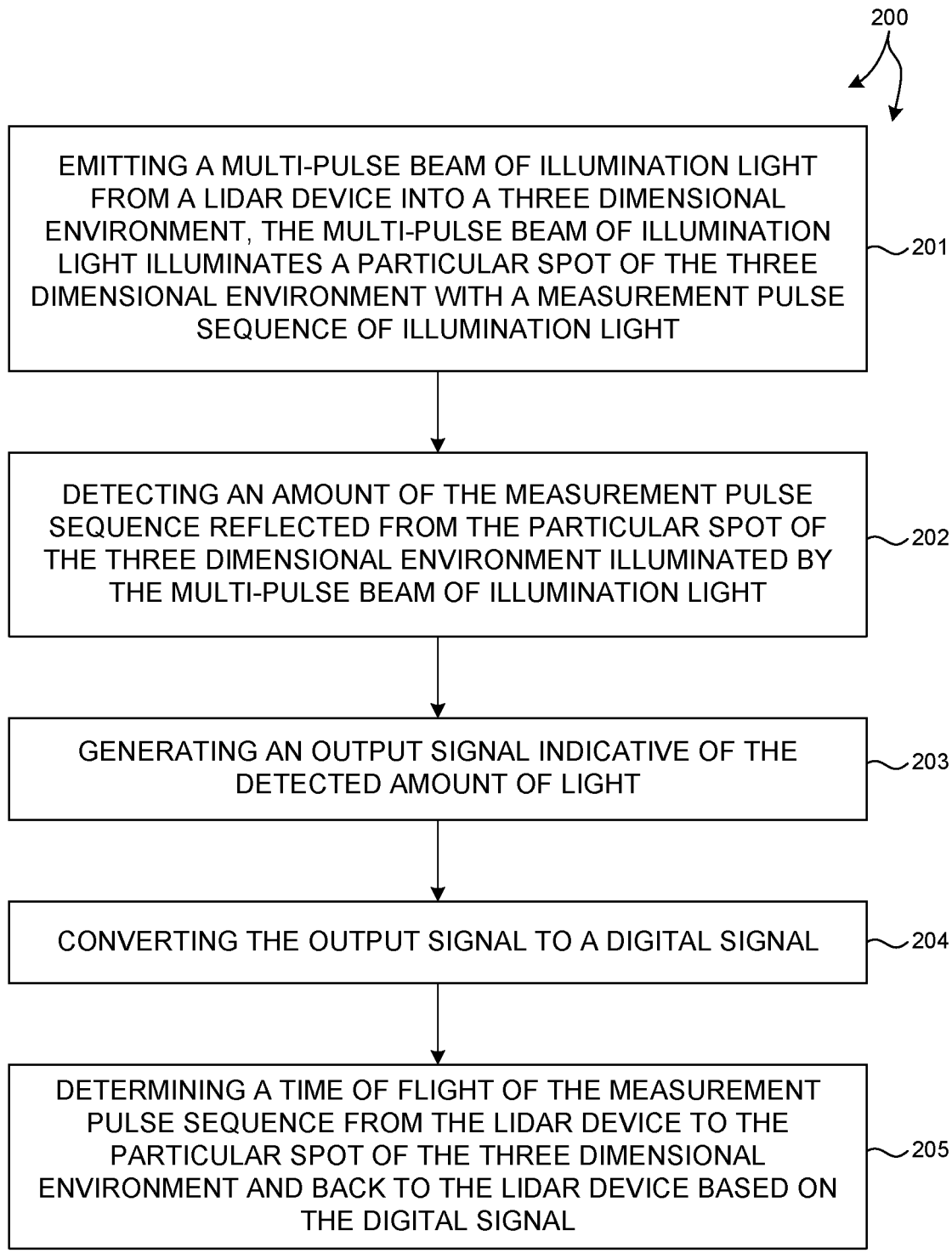
FIG. 14 depicts a flowchart illustrative of a method 200 of performing multiple pulse LIDAR measurements in at least one novel aspect.

FIG. 14 illustrates a method 200 of performing multiple pulse LIDAR measurements in at least one novel aspect. Method 200 is suitable for implementation by a LIDAR system such as LIDAR systems 100 and 10 illustrated in FIGS. 1 and 2, respectively, of the present invention. In one aspect, it is recognized that data processing blocks of method 200 may be carried out via a pre-programmed algorithm executed by one or more processors of controller 140, or any other general purpose computing system. It is recognized herein that the particular structural aspects of LIDAR systems 100 and 10 do not represent limitations and should be interpreted as illustrative only.

In block 201, a multi-pulse beam of illumination light is emitted from a LIDAR device into a three dimensional environment. The multi-pulse beam of illumination light illuminates a particular spot of the three dimensional environment with a measurement pulse sequence of illumination light.

In block 202, an amount of the measurement pulse sequence reflected from the particular spot of the three dimensional environment illuminated by the multi-pulse beam of illumination light is detected during a measurement time window. The measurement time window has a duration that exceeds the time of flight of light over a distance that is twice the measurement range of the LIDAR device.

In block 203, an output signal indicative of the detected amount of light is generated.

In block 204, the output signal is converted to a digital signal, for example, by analog to digital conversion electronics of controller 140 depicted in FIG. 7.

In block 205, a time of flight of the measurement pulse sequence from the LIDAR device to the particular spot of the three dimensional environment and back to the LIDAR device is determined based on the digital signal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:
    a multiple pulse illumination source emitting a multi-pulse beam of illumination light from the LIDAR device into a three dimensional environment, the multipulse beam of illumination light illuminates a particular spot of the three dimensional environment with a measurement pulse sequence of illumination light including multiple pulses of illumination light, the multiple pulse illumination source comprising:
      a pulsed light emitting device;
      a plurality of electrical energy storage elements selectively coupled to the pulsed light emitting device;
      an electrical energy source electrically coupled to the plurality of electrical energy storage elements, wherein the electrical energy source provides electrical energy to the plurality of electrical energy storage devices; and
      a plurality of switching elements configured to generate, in response to an amount of noise in an output signal generated by a photosensitive detector, an encoded signal within the measurement pulse sequence by selectively coupling each of the plurality of energy storage elements to the pulsed light emitting device so that the measurement pulse sequence is different from another measurement pulse sequence from any other pulse illumination source;
    the photosensitive detector that detects an amount of the measurement pulse sequence reflected from the particular spot of the three dimensional environment illuminated by the multi-pulse beam of illumination light and generates the output signal indicative of the detected amount of light; and
    a computing system configured to:
      receive the output signal indicative of the detected amount of light;
      convert the output signal to a digital signal; and
      determine a time of flight of the measurement pulse sequence from the LIDAR device to the particular spot of the three dimensional environment and back to the LIDAR device based on the digital signal.

2. The LIDAR device of claim 1, wherein the computing system is further configured to:
    communicate a control signal to each of the plurality of switching elements, wherein the control signal causes one or more of the plurality of switching elements to change state from a substantially electrically non-conductive state to a substantially electrically conductive state.

3. The LIDAR device of claim 2, wherein the control signal causes a sequence of electrical discharges from more than one electrical storage element to the pulsed light emitting device, and wherein the pulsed light emitting device receives the sequence of electrical discharges and generates the multi-pulse beam of illumination light.

4. The LIDAR device of claim 3, wherein the multi-pulse beam of illumination light includes a first pulse having a first amplitude and a second pulse having a second amplitude greater or smaller than the first amplitude.

5. The LIDAR device of claim 3, wherein the multi-pulse illumination beam includes a first pulse having a first duration and a second pulse having a second duration greater or smaller than the first duration.

6. The LIDAR device of claim 3, wherein the multi-pulse illumination beam includes a first pulse having a first duration and a first amplitude and a second pulse having a second duration and a second amplitude, wherein the second amplitude is greater than the first amplitude, and the second duration is greater than the first duration.

7. The LIDAR device of claim 3, wherein the multi-pulse illumination beam is encoded according to a code diversity scheme, an amplitude diversity scheme, a time diversity scheme, or a combination thereof.

8. The LIDAR device of claim 1, wherein the computing system is further configured to:
    determine a time of detection associated with each of a plurality of successive instances of the output signal that exceed a threshold value; and
    determine if a time between each of the successive instances is substantially similar to a time between multiple pulses of the multi-pulse beam of illumination light, wherein the determining of the time of flight of the multi-pulse beam of illumination light is based on a difference between a time when the multi-pulse beam is emitted from the LIDAR device and the time of detection associated with each of the plurality of successive instances of the output signal that exceed the threshold value.

9. The LIDAR device of claim 1, wherein the computing system is further configured to:
    filter the output signal; and
    determine an instance when the filtered output signal exceeds a threshold value, wherein the determining of the time of flight of the multi-pulse beam of illumination light is based on a difference between a time when the multi-pulse beam is emitted from the LIDAR device and a time of detection associated with the instance when the filtered output signal exceeds the threshold value.

10. The LIDAR device of claim 9, wherein the filtering involves a signature detection filter.

11. The LIDAR device of claim 1, wherein the output signal indicative of the detected amount of light is generated during a measurement time window having a duration that exceeds the time of flight of light over a distance that is twice the measurement range of the LIDAR device.

12. A light detection and ranging (LIDAR) device, comprising:
    a multiple pulse illumination source emitting a multi-pulse beam of illumination light from the LIDAR device into a three dimensional environment, the multi-pulse beam of illumination light illuminates a particular spot of the three dimensional environment with a measurement pulse sequence of illumination light including multiple pulses of illumination light, the multiple pulse illumination source comprising:

a pulsed light emitting device;

a plurality of electrical energy storage elements selectively coupled to the pulsed light emitting device;

an electrical energy source electrically coupled to the plurality of electrical energy storage elements, wherein the electrical energy source provides electrical energy to the plurality of electrical energy storage devices; and a plurality of switching elements configured to generate, in response to an amount of noise in an output signal generated by a photosensitive detector, an encoded signal within the measurement pulse sequence by selectively coupling each of the plurality of energy storage elements to the pulsed light emitting device so that the measurement pulse sequence is different from another measurement pulse sequence from any other pulse illumination source;

the photosensitive detector that detects an amount of the measurement pulse sequence reflected from the particular spot of the three dimensional environment illuminated by the multi-pulse beam of illumination light and generates an output signal indicative of the detected amount of light; and a non-transitory computer readable medium storing an amount of program code that when executed by a computing system causes the computing system to:
receive the output signal indicative of the detected amount of light; convert the output signal to a digital signal; and
determine a time of flight of the measurement pulse sequence from the LIDAR device to the particular spot of the three dimensional environment and back to the LIDAR device based on the digital signal.

13. The LIDAR device of claim 12, wherein the multi-pulse beam of illumination light includes a first pulse having a first amplitude and a second pulse having a second amplitude greater or smaller than the first amplitude.

14. The LIDAR device of claim 12, wherein the multi-pulse illumination beam includes a first pulse having a first duration and a second pulse having a second duration greater or smaller than the first duration.

15. The LIDAR device of claim 12, wherein the multi-pulse illumination beam is encoded according to a code diversity scheme, an amplitude diversity scheme, a time diversity scheme, or a combination thereof.

16. The LIDAR device of claim 12, wherein the amount of program code further causes the computing system to:
filter the output signal; and
determine an instance when the filtered output signal exceeds a threshold value, wherein the determining of the time of flight of the multi-pulse beam of illumination light is based on a difference between a time when the multi-pulse beam is emitted from the LIDAR device and a time of detection associated with the instance when the filtered output signal exceeds the threshold value.

17. The LIDAR device of claim 12, wherein the output signal indicative of the detected amount of light is generated during a measurement time window having a duration that exceeds the time of flight of light over a distance that is twice the measurement range of the LIDAR device.

18. A method comprising:
encoding, in response to an amount of noise in an output signal generated by a photosensitive detector of a light detection and ranging (LIDAR) device, a multi-pulse beam of illumination light using a multiple pulse illumination source so that the multi-pulse beam of illumination light is different from another multi-pulse beam of illumination light from any other pulse illumination source, the multiple pulse illumination source comprising:
a pulsed light emitting device;
a plurality of electrical energy storage elements selectively coupled to the pulsed light emitting device;
a plurality of switching elements configured to selectively couple each of the plurality of energy storage elements to the pulsed light emitting device at different times; and
an electrical energy source electrically coupled to the plurality of electrical energy storage elements, wherein the electrical energy source provides electrical energy to the plurality of electrical energy storage devices;

detecting an amount of the measurement pulse sequence reflected from the particular spot of the three dimensional environment illuminated by the multi-pulse beam of illumination light;

generating an output signal indicative of the detected amount of light; converting the output signal to a digital signal; and determining a time of flight of the measurement pulse sequence from the LIDAR device to the particular spot of the three dimensional environment and back to the LIDAR device based on the digital signal.

19. The method of claim 18, wherein the multi-pulse beam of illumination light includes a first pulse having a first amplitude and a second pulse having a second amplitude greater or smaller than the first amplitude, a first pulse having a first duration and a second pulse having a second duration greater or smaller than the first duration, or a combination thereof.

20. The method of claim 18, wherein the multi-pulse illumination beam is encoded according to a code diversity scheme, an amplitude diversity scheme, a time diversity scheme, or a combination thereof.

21. The method of claim 18, further comprising: filtering the output signal; and
determining an instance when the filtered output signal exceeds a threshold value, wherein the determining of the time of flight of the measurement pulse sequence is based on a difference between a time when the measurement pulse sequence is emitted from the LIDAR device and a time of detection associated with the instance when the filtered output signal exceeds the threshold value.

22. The method of claim 18, wherein the amount of the measurement pulse sequence reflected from the particular spot of the three dimensional environment illuminated by the multi-pulse beam of illumination light is detected during a measurement time window having a duration that exceeds the time of flight of light over a distance that is twice the measurement range of the LIDAR device.

* * * * *